(12) United States Patent
Liu et al.

(10) Patent No.: US 12,437,003 B2
(45) Date of Patent: Oct. 7, 2025

(54) IDENTIFICATION OF INFLUENTIAL NODES IN GRAPH DATASETS USING COMBINATORIAL OPTIMIZATION FORMULATIONS

(71) Applicant: Fujitsu Limited, Kawasaki (JP)

(72) Inventors: Xiaoyuan Liu, San Jose, CA (US); Ankith Mohan, Blacksburg, VA (US); Sarvagya Upadhyay, San Jose, CA (US)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 18/156,330

(22) Filed: Jan. 18, 2023

(65) Prior Publication Data

US 2024/0241910 A1 Jul. 18, 2024

(51) Int. Cl.
*G06F 16/906* (2019.01)
*G06F 16/901* (2019.01)
*G06Q 50/00* (2024.01)

(52) U.S. Cl.
CPC ........ *G06F 16/906* (2019.01); *G06F 16/9024* (2019.01); *G06Q 50/01* (2013.01)

(58) Field of Classification Search
CPC .... G06F 16/906; G06F 16/9024; G06Q 50/01
See application file for complete search history.

(56) References Cited

U.S. PATENT DOCUMENTS 9,189,567 B1* 11/2015 Goldman ............ G06F 16/9535
2015/0120721 A1* 4/2015 Kim ..................... G06F 16/248
707/728
2017/0286852 A1* 10/2017 Rezaie .................. G06Q 50/01
2018/0315083 A1* 11/2018 Makse ............... G06Q 30/0254
2019/0236215 A1* 8/2019 Agarwal ............. G06F 16/9014

OTHER PUBLICATIONS

Feige et al. "Approximation algorithms for maximization problems arising in graph partitioning" 2001.
Domingos et al. "Mining the network value of customers" 2001.
Maehara et al "Exact computation of influence spread by binary decision diagrams" 2017.
Borgs et al. "Maximizing social influence in nearly optimal time" 2014.
Zhang et al. "Recent advances in information diffusion and influence maximization in complex social networks" 2014.

* cited by examiner

*Primary Examiner* — Apu M Mofiz
*Assistant Examiner* — Farhad Agharahimi
(74) *Attorney, Agent, or Firm* — Maschoff Brennan (57) ABSTRACT

A method may include obtaining a graph dataset that represents a social network and includes a plurality of nodes. The method may include partitioning the graph dataset into a first node cluster and a second node cluster in which the first node cluster and the second node cluster each include one or more nodes from the graph dataset. The method may include identifying one or more first candidate influential nodes included in the first node cluster and one or more second candidate influential nodes included in the second node cluster. The method may include selecting one or more of the first candidate influential nodes and the second candidate influential nodes as influencer nodes and identifying a respective object included in the social network corresponding to each of the influencer nodes.

15 Claims, 4 Drawing Sheets

IDENTIFICATION OF INFLUENTIAL NODES IN GRAPH DATASETS USING COMBINATORIAL OPTIMIZATION FORMULATIONS

The present disclosure generally relates to identification of influential nodes in graph datasets using combinatorial optimization formulations.

BACKGROUND

Data points may be presented as multiple nodes included in a dataset referred to as a graph. Nodes included in the graph dataset may be grouped together according to similarities and differences between the nodes. Machine learning models may be trained to classify the nodes into one or more groups according to a given data analysis task or goal.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

According to an aspect of an embodiment, a method may include obtaining a graph dataset that represents a social network and includes a plurality of nodes. The method may include partitioning the graph dataset into a first node cluster and a second node cluster in which the first node cluster and the second node cluster each include one or more nodes from the graph dataset. The method may include identifying one or more first candidate influential nodes included in the first node cluster and one or more second candidate influential nodes included in the second node cluster. The method may include selecting one or more of the first candidate influential nodes and the second candidate influential nodes as influencer nodes and identifying a respective object included in the social network corresponding to each of the influencer nodes.

The object and advantages of the embodiments will be realized and achieved at least by the elements, features, and combinations particularly pointed out in the claims. It is to be understood that both the foregoing general description and the following detailed description are explanatory and are not restrictive of the invention, as claimed.

BRIEF DESCRIPTION OF THE DRAWINGS

Example embodiments will be described and explained with additional specificity and detail through the accompanying drawings in which.

DETAILED DESCRIPTION

A set of objects may be considered to be part of an interrelated network if the objects included in the set are related to one another in some way. For example, a particular set of objects may include a group of user accounts on a social media platform in which a particular user account may be related to one or more other user accounts via friendships between the user accounts, following-follower relationships, social interactions, or any other types of relationships between the user accounts. As an additional or alternative example, a particular set of objects may include one or more locations in a particular geographical area in which the relationships between the locations include roadways connecting a particular location to one or more other locations in the particular geographic area. Interrelated objects may be difficult to analyze due to relationships between two or more of the objects. Furthermore, as the number of objects increases, the complexity of the relationships between the objects may also increase, which may further increase the difficulty of an analysis. Graph datasets may be used to quantify and model such interrelated objects as a network of objects in which pairs of objects included in the network may or may not be related to one another. A particular graph dataset may include vertices that represent the objects in a particular network and edges that connect two objects included in the particular graph dataset. In some situations, the edges may be directed edges and/or weighted edges that provide quantitative information regarding the directionality and/or significance of relationships between particular objects.

Representing interrelated objects as a graph dataset may facilitate identification of a particular object, identified as a node included in the graph dataset, that influences other objects included in the graph dataset in some way. The way in which a particular object influences another object may differ depending on the context in which the particular object and the other object are related, the particular network environment in which the objects are included, or based on any other factors. For example, a graph that represents a social network may include nodes representing users, media, or any other objects related to the social network, and the edges connecting the objects may represent friendships, page views, commenting behavior, reactions, impressions, or any other interactions between the objects. The influence a particular object may have on other objects in the social network may involve how connected the particular object is (e.g., a social media influencer account), how quickly the particular object is viewed or otherwise interacts with other objects (e.g., a viral video or news story), or the like.

An existing influence model is the independent cascade diffusion model, which assumes a subset of nodes included in a graph begin propagating influence on other nodes in the graph with particular respective probabilities between the nodes included in the subset and the other nodes in the graph. At each progressive time step, nodes that have been influenced may each have a single chance of influencing one or more adjacent nodes to continue propagation of the influence. Newly influenced nodes may continue to propagate influence on other nodes until all of the nodes included in the graph have been influenced. Based on how influence propagated between the nodes of the graph, the degree of influence for a particular node may be determined.

Additionally or alternatively, another existing influence model is a linear threshold diffusion model. In the linear threshold diffusion model, each node may be assigned a random threshold parameter, and each edge between the nodes may be associated with a respective weight. For a particular node, a set of adjacent nodes that have been influenced by the particular node may be determined based on the random threshold parameter assigned to each of the nodes and the weights of the edges connecting the particular node to its neighboring nodes. Different criteria may be considered in determining whether the particular node exerts more influence on or is more influenced by its neighboring nodes. For example, the particular node may be considered influenced if a first sum of the weights of the edges from the neighboring nodes to the particular node is greater than a second sum of the weights of the edges from the particular node to the neighboring nodes.

Existing graph influence models such as the independent cascade diffusion model and the linear threshold diffusion model, however, may include disadvantages when applied to certain real-world applications. In particular, existing graph influence models may fail to account for object behavior that is specific to the network in which the object is included that may contradict assumptions made in existing graph influence models. Social networks, for example, may present such unique object behaviors. Not all nodes (e.g., users of the social network) may be influenced as predicted in existing graph influence models. For example, some nodes may represent users who completely lack interest in various topics. As an additional or alternative example, influence propagation behavior of particular objects may differ depending on various factors, such as the user interface of the social network, the time of the year, the topic or focus of the object, or any other considerations. Additionally or alternatively, synergistic or other cumulative effects (e.g., social pressure or "mob mentality" in social networks) may be stronger or weaker than predicted by assumptions used in existing graph influence models. In other words, real-world influence propagation may be too complicated to be represented using existing graph influence models.

The present disclosure may relate to, among other things, a system and/or a method of modeling influence maximization as a discrete optimization problem. Influence maximization may involve a graph that includes a group of objects, V, with directed edges, E, each having respective weights, W, between one or more of the objects. The influence of a subset of objects, S, on the group of objects may be represented based on the cumulative sum of the weights of the edges originating from the subset of objects and ending in the objects included in the rest of the group. This influence may be represented as a parameter, $E_w(S, V|S)$, that may be maximized over all subsets of objects with each subset of objects having a maximum size, k. This representation of influence maximization may be treated as a discrete optimization problem, such as a quadratic objective function with linear constraints.

Embodiments of the present disclosure are explained with reference to the accompanying figures.

Figure 1:
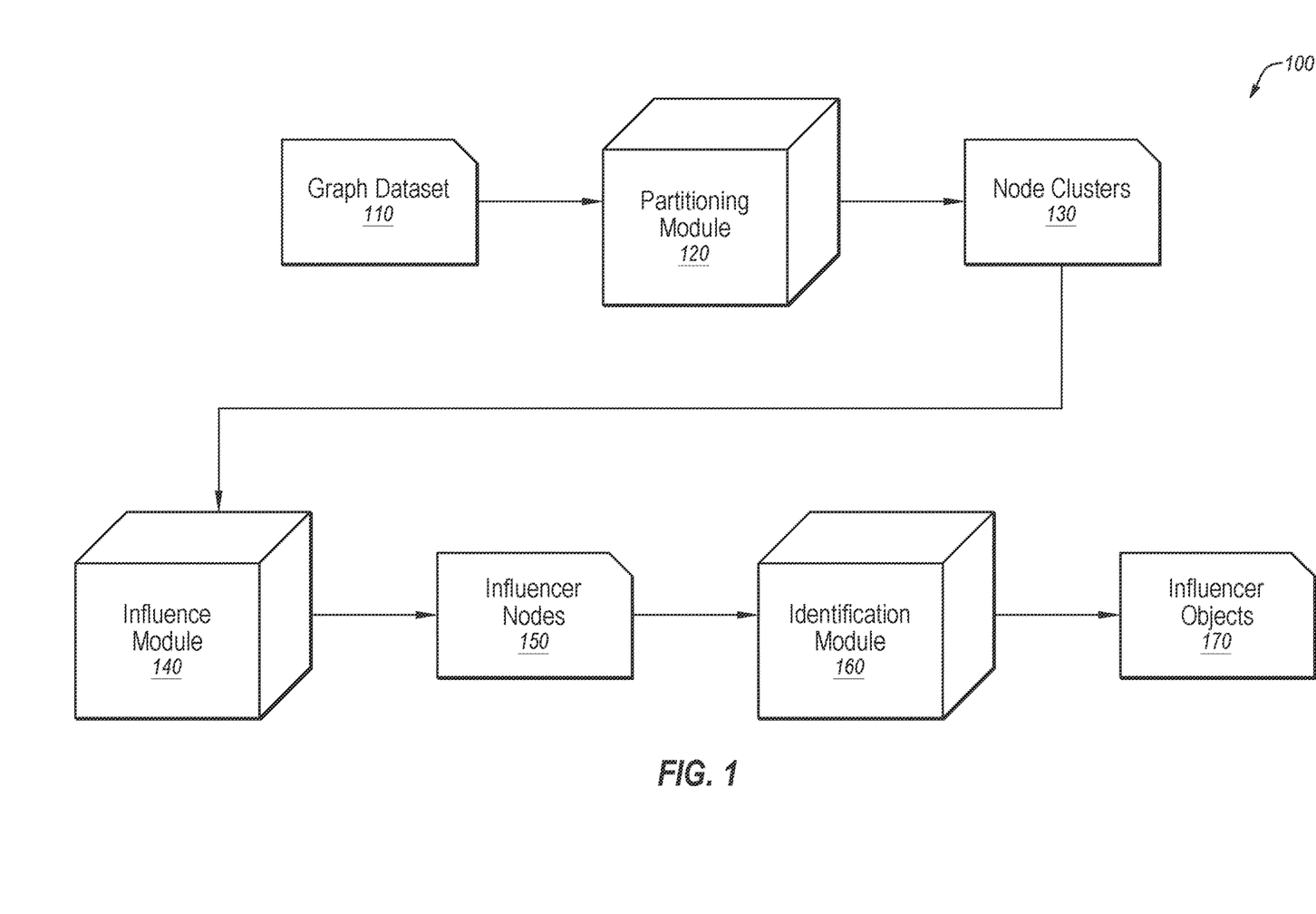
FIG. 1 is a diagram of an example operating environment in which an influential node included in a graph dataset may be identified according to one or more embodiments of the present disclosure.

FIG. 1 is a diagram of an example embodiment of an operating environment 100 in which an influential node included in a graph dataset may be identified according to one or more embodiments of the present disclosure. The operating environment 100 may include a partitioning module 120, an influence module 140, and/or an identification module 160 that are configured to obtain a graph dataset 110 and output an influencer node 150 and/or a corresponding identified influencer object 170 included in the graph dataset 110.

In some embodiments, the partitioning module 120, the influence module 140, and/or the identification module 160 (collectively referred to herein as "the computing modules") may include code and routines configured to enable a computing system to perform one or more operations. Additionally or alternatively, the computing modules may be implemented using hardware including a processor, a microprocessor (e.g., to perform or control performance of one or more operations), a field-programmable gate array (FPGA), or an application-specific integrated circuit (ASIC). In some other instances, the computing modules may be implemented using a combination of hardware and software. In the present disclosure, operations described as being performed by the computing modules may include operations that the computing modules may direct one or more corresponding systems to perform. The computing modules may be configured to perform a series of operations with respect to the graph dataset 110, the node clusters 130, the influencer nodes 150, and/or the identified influencer object 170 as described in further detail below and in relation to an example method 300 as described with respect to FIG. 3.

Figure 2:
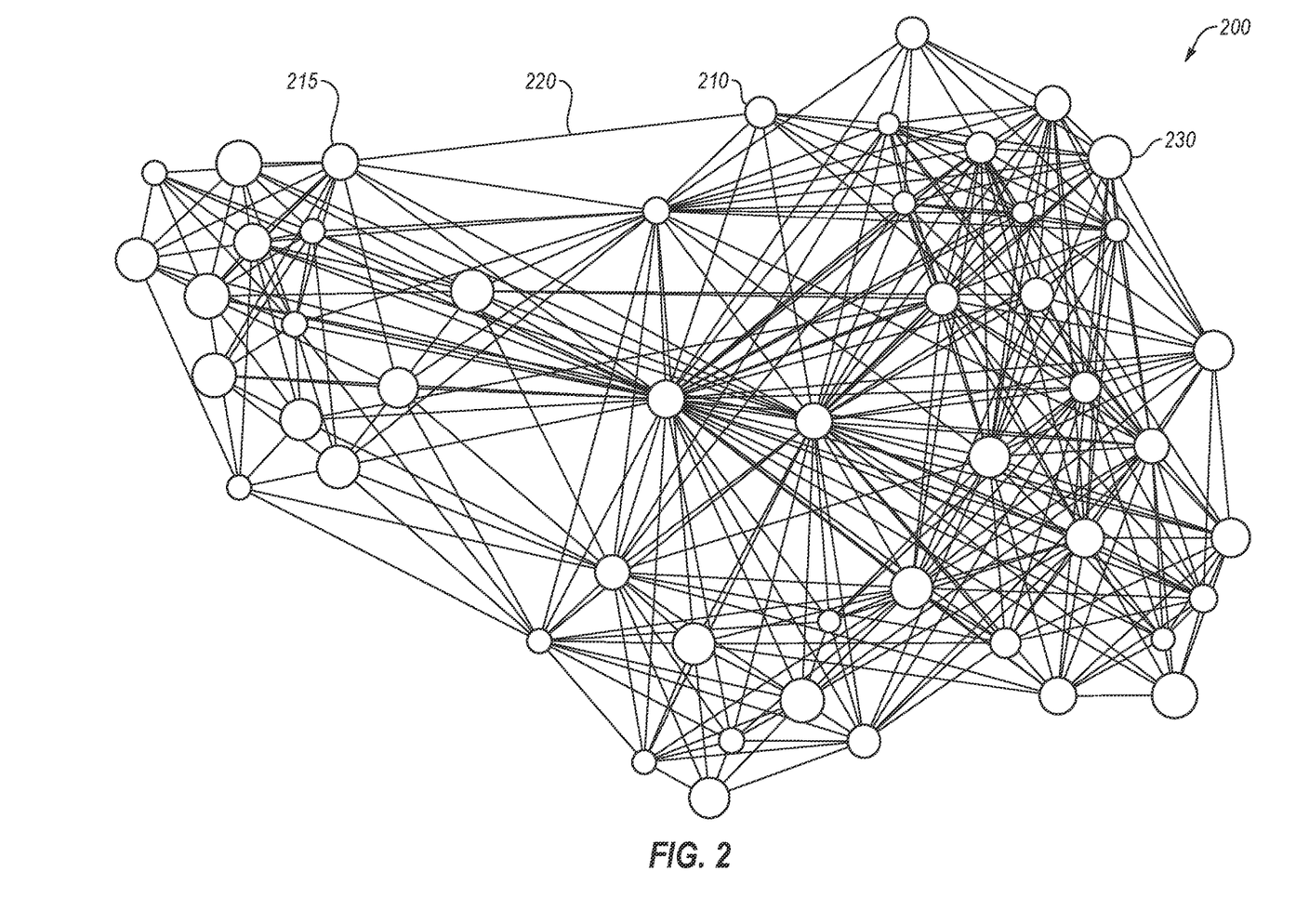
FIG. 2 illustrates an example graph dataset that may include an influential node identifiable according to one or more embodiments of the present disclosure.

The graph dataset 110 may be a graphical representation of a network of objects in which one or more of the objects are related to one or more other objects included in the network. For example, FIG. 2 illustrates an example graph dataset 200 that may include an influential node identifiable according to one or more embodiments of the present disclosure. The graph dataset 200 may include a first object represented by a first node 210 and a second object represented by a second node 215 that are related to each other in some way. The relationship between the first object and the second object may be represented by an edge 220 that connects the first node 210 and the second node 215. Additionally or alternatively, the first node 210 and/or the second node 215 may be related to one or more other nodes included in the graph dataset 200 such that multiple edges extend from the first node 210 and/or the second node 215 towards the other nodes.

As illustrated in FIG. 2, the example graph dataset 200 may be an undirected graph dataset because the edge 220 and other edges illustrated in the example graph dataset 200 do not include directionality indicating how nodes are related to one another. The graph dataset 110 of the environment 100 may include a directed graph dataset in which the edges include directionality to indicate whether a particular relationship between a first node, such as the first node 210, and a second node, such as the second node 215, is unilateral or reciprocal. For example, a particular graph dataset may represent a flow of resources, such as products, money, and/or services, between multiple entities (e.g., different commercial entities) in which the one-way flow of resources from a first entity to a second entity is represented by a particular first edge depicted by a single-headed arrow or any other unidirectional indicator. As an additional or alternative example, a two-way flow of resources between the first entity and the second entity may be represented by a particular second edge depicted by a double-headed arrow or any other bidirectional indicator.

In some embodiments, the graph dataset 200 may include one or more influential nodes, such as an influential node 230. The influential node 230 may represent an object in the network represented by the graph dataset 200 in which operations, behaviors, and/or actions of the object represented by the influential node 230 is likely to affect the operations, behaviors, and/or actions of other nodes included in the graph dataset 200. In these and other embodiments, the influential node 230 may or may not be identified and/or readily identifiable in the graph dataset 200. For example, determining whether a user on a social media network should be classified as an influential user may or may not be apparent based on the user's connections to other users, frequency of posting content on the social media network, or based on any other interactions with the social media network.

Returning to the description of the environment 100 of FIG. 1, the partitioning module 120 may be configured to identify a number, m, of node clusters 130 with each node cluster 130 including n nodes. The partitioning module 120 may divide the nodes included in the graph dataset 110 into a number of node clusters 130 such that each node cluster 130 includes the same or a similar number of nodes within a threshold value (e.g., within an absolute tolerance value or a relative percentage tolerance level). In some embodiments, the partitioning module 120 may be configured to randomly identify the m node clusters 130 so that each of the node clusters 130 include approximately n nodes. Clustering the nodes of the graph dataset 110 according to the degree of connectivity between the nodes, such as via a spectral clustering process, may result in identification of unbalanced clusters in which a first node cluster may include a disproportionate number of nodes relative to other identified clusters. Consequently, dividing the graph dataset 110 into a set of balanced node clusters 130 in which each node cluster 130 includes the same or a similar number of nodes may improve identification of influential nodes included in the graph dataset 110 during the process performed in the environment 100.

The influence module 140 may be configured to identify one or more influencer nodes 150 included in each of the node clusters 130. In some embodiments, the influence module 140 may be configured to initially identify one or more candidate influential nodes included in each of the node clusters 130. In these and other embodiments, identification of the candidate influential nodes may be cast as an optimization problem, and hence optimization-problem-solving techniques may be applied to identify the candidate influential nodes. For example, an optimization process or a digital annealing process may be applied.

The influence module 140 may aggregate the candidate influential nodes as a set of candidate influential nodes and compute a cumulative influence based on the influence exerted by each of the candidate influential nodes on each other node included in the graph dataset 110 but not included in the set of candidate influential nodes. By aggregating the candidate influential nodes in the set, the cumulative influence of the candidate influential nodes may be computed based on the influence each candidate influential node exerts on each other node that is not identified as a candidate influential node. In other words, computing the cumulative influence between the set of candidate influential node and each other node included in the graph dataset 110 may remove from consideration the influence a particular candidate influential node exerts on other candidate influential nodes.

In these and other embodiments, the cumulative influence of the set of candidate influential nodes may be computed according to an influence maximization algorithm as described in relation to Equation (1) below. The influence maximization algorithm may be solved as an optimization problem. Whether a particular node included in a particular node cluster 130 may be considered an influencer node 150 may be modeled according to the following objective function:

$$\sum_{u,v \in V} W_{uv} x_u (x_u - x_v) \quad (1)$$

The objective function represented by Equation (1) may be optimized by determining values corresponding to the variables, $x_u$ and $x_v$, that would result in the greatest value summation based on a weight matrix, $W_{uv}$, that indicates the influence of a particular node, $x_u$, on another node, $x_v$, included in the same node cluster 130. The objective function may be treated as a quadratic unconstrained binary optimization (QUBO) function by setting the values of the variables representing the influence of the particular node, $x_u$, and the influence of the other nodes, $x_v$, as one of two possible values, such as 0 and 1. By setting Equation (1) as a QUBO function, the value of the $x_u(x_u - X_v)$ term contributes to the summation in situations in which the particular node, $x_u$, is an influential node and the other node, $x_v$, is not an influential node.

The weight matrix, $W_{uv}$, may show the influence a first node (e.g., $x_u$) exerts on a second node (e.g., $x_v$) for each pair of nodes included in a graph dataset, such as the graph dataset 110. In some embodiments, rows of the weight matrix may represent the node exerting influence and columns of the weight matrix may represent the nodes on which the influence is being exerted (or vice versa). Consequently, for unweighted graphs, the degree of influence for each edge of the graph may be considered equal such that each entry included in the weight matrix has a value of 1.

For weighted graphs, the degree of influence between a first pair of nodes may be more or less important than the degree of influence between a second pair of nodes. Additionally, or alternatively, the degree of influence between a first pair of nodes that are separated by one degree of separation (e.g., two users on a social network who are directly friends with one another) may be greater than the degree of influence between a second pair of nodes that are separated by two degrees of separation (e.g., two users on a social network who are not directly friends, but have a particular same mutual friend). The weighted graph may represent an environment in which the relationship between the objects represented by the first pair of nodes is more or less important than the relationship between the objects represented by the second pair of nodes.

For example, a particular graph that includes nodes representing buildings and edges representing roads in between the buildings. In this example, the roads that experience greater traffic flows may be designated as having greater weights than the roads that are less traveled such that buildings that are highly connected to the roads with greater traffic flows may be considered more influential. In other words, the buildings that are connected to the roads that experience greater traffic flows may be assumed to be important to a greater number of people. As an additional or alternative example, a particular graph may represent a social network in which the nodes of the particular graph represent user accounts on the social network. The edges between the nodes may represent friendships between the user accounts, and the edges may be weighted based on whether a particular user account is likely to be important (e.g., the particular user account is associated with a celebrity or an authority figure) and/or the degree of separation between the particular user account and another user account. Additionally or alternatively, a particular edge may include directionality properties that indicate whether the particular edge represents a one-directional relationship between a first node and a second node or a two-directional relationship between the first node and the second node. The directionality property may represent particular types of relationships between objects that are modeled by the corresponding graph. Returning to the previous social network example, a one-directional or unidirectional relationship may involve a follower relationship in which a first user follows a second user (e.g., so that the first user is notified of the second user's engagement with the social network), while the second user does not follow the first user. As an additional or alternative example, the one-directional relationship may indicate that the first user heavily interacts with social media content produced by the second user, while the second user may not be interacting with social media content produced by the first user. As an additional or alternative example, a two-directional or bidirectional relationship in the social network may indicate mutual followership, friendship status, equal or approximately equal engagement with social media content, equal or similar degrees of separation, some combination thereof, or any other reciprocal relationship between the first user and the second user.

The influence module 140 may be configured to select the top k candidate influential nodes that contribute the most to the cumulative influence of the influential nodes and designate the selected nodes as the influencer nodes 150. A constraint may be imposed on the total number of influencer nodes 150 such that:

$$\sum_{u \in V} x_u \leq k \quad (2)$$

in which the number of influencer nodes 150, $x_u$, may not exceed an influential node set size, k. In these and other embodiments, the influential node set size, k, may be proportional to a total number of nodes included in the node cluster 130 and/or a total number of nodes included in the graph dataset 110. For example, the influential node set size, k, may be proportional to the order of log(n), in which n represents the total number of nodes included in the graph dataset 110.

In some embodiments, the influence module 140 may be configured to solve the objective function represented by Equation (1) using a quantum approximate optimization algorithm (QAOA) or convex relaxation techniques such that the values of the variables representing the influence of the particular node, $x_u$, and the influence of the other nodes, $x_v$, are represented by −1 or 1 rather than 0 or 1. In these and other embodiments, the influence module 140 may be configured to set a reference variable, $y_0$, such that a particular node, u, is an influencer node 150 if and only if the influence value of the particular node, $y_u$, is equal to the reference value. Accordingly the objective function may be written as:

$$\sum_{u,v \in V} \frac{W_{uv}(1 + y_0 y_u - y_0 y_v - y_u y_v)}{4} \quad (3)$$

in which $y_v$ represents an influence variable of another node included in the same node cluster 130 as the particular node, u, having the influence value, $y_u$. The constraint imposed on the total number of influencer nodes 150 may be written as:

$$\sum_{u \in V} y_0 y_u \leq 2n - k \quad (4)$$

In these and other embodiments, the influence module 140 may be configured to identify one or more influencer nodes 150 per node cluster 130 by solving the objective function as a QUBO function represented by Equation (1), which is presented in a format that is solvable by a digital annealing unit, or as a QUBO function represented by Equation (3), which is presented in a format that is solvable using QAOA or other quantum annealing techniques.

In some embodiments, the number of influencer nodes 150 identified by the influence module 140 may be set based on the total number of nodes included in the graph dataset 110. For example, an absolute number of influencer nodes 150 may be identified per node cluster (e.g., one node, two nodes, three nodes, four nodes, five nodes, etc.). As an additional or alternative example, a percentage of a particular node cluster 130 may be identified as influential nodes (e.g., one percent, two percent, five percent, ten percent, etc. of the particular node cluster 130).

The identification module 160 may be configured to obtain the influencer nodes 150 and identify one or more influencer objects 170 that correspond to the influencer nodes 150. In some embodiments, all of the influencer nodes 150 identified by the influence module 140 may be mapped to objects corresponding to the influencer nodes 150 in the graph dataset 110 to identify the influencer objects 170.

Additionally or alternatively, the identification module 160 may be configured to select a subset of the influencer nodes 150 and identify the influencer objects 170 that correspond to the subset of the influencer nodes 150. The identification module 160 may include instructions to organize the influencer nodes 150 according to the influence each influencer node 150 has on the graph dataset 110. The identification module 160 may select a threshold number of influencer nodes 150, such as the top k influencer nodes 150 or the top k-th percent of influencer nodes 150 that have the most influence on the other nodes of the graph dataset 110, and identify the selected influencer nodes 150 as the influencer objects 170.

Modifications, additions, or omissions may be made to the environment 100 without departing from the scope of the present disclosure. For example, the designations of different elements in the manner described is meant to help explain concepts described herein and is not limiting. For instance, in some embodiments, the graph dataset 110, the node clusters 130, the influencer nodes 150, and the identified influencer object 170 are delineated in the specific manner described to help with explaining concepts described herein but such delineation is not meant to be limiting. Further, the environment 100 may include any number of other elements or may be implemented within other systems or contexts than those described.

Figure 3:
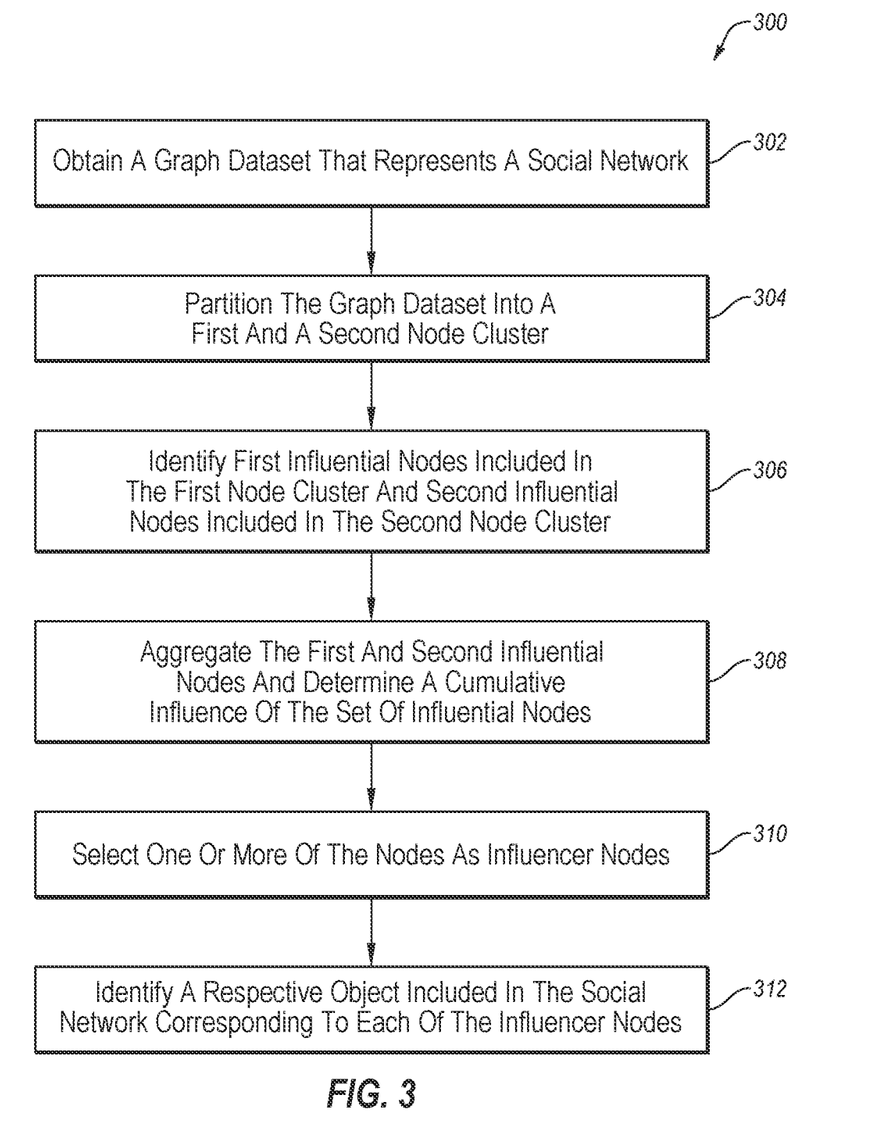
FIG. 3 is a flowchart of the example method of identifying an influential node included in a graph dataset according to one or more embodiments of the present disclosure.

FIG. 3 is a flowchart of the example method 300 of identifying an influential node included in a graph dataset according to one or more embodiments of the present disclosure. The method 300 may be performed by any suitable system, apparatus, or device. For example, the partitioning module 120, the influence module 140, and/or the identification module 160 of FIG. 1 may perform one or more operations associated with the method 300. Although illustrated with discrete blocks, the steps and operations associated with one or more of the blocks of the method 300 may be divided into additional blocks, combined into fewer blocks, or eliminated, depending on the particular implementation.

The method 300 may begin at block 302, where a graph dataset that represents a social network is obtained. In some embodiments, the graph dataset may be the same as or similar to the graph dataset 110 described in relation to the environment 100 of FIG. 1 and/or the graph dataset 200 described in relation to FIG. 2. For example, users and/or topics (e.g., hashtags, trending videos, user posts, or the like)

may be modeled as the nodes of the graph dataset. In these and other examples, relationships between the users (e.g., friendships, following, subscribing, blocking, some combination thereof, or any other interactive behaviors between users) and/or relationships between the topics (e.g., frequency of being co-referenced, use by the same or similar users, or any other interactive behaviors between topics) may be represented as the edges between the nodes of the graph dataset. Additionally or alternatively, the graph dataset may be a weighted graph dataset in which the edges connecting the nodes include respective weight values based on respective degrees of connectedness between the nodes. Additionally or alternatively, the graph dataset may be a directed graph dataset in which the edges include respective directional orientations based on whether the respective edges represent unilateral or reciprocal relationships between the respective nodes.

At block 304, the graph dataset may be partitioned into a first node cluster and a second node cluster. In some embodiments, partitioning the graph dataset may involve dividing the nodes into balanced clusters in which each cluster includes the same or a similar number of nodes from the graph dataset. Although described at block 304 as including the first node cluster and the second node cluster, it may be appreciated that the graph dataset may be partitioned into more than two clusters. Partitioning of the graph dataset may depend on the size of the graph dataset (e.g., the number of nodes included in the graph dataset), a number of influential nodes expected to be included in the graph dataset, or according to any other characteristics of the graph dataset. For example, a first graph dataset that include a greater number of nodes may be partitioned into a greater number of clusters relative to a second graph dataset that includes fewer nodes than the first graph dataset.

At block 306, first influential nodes included in the first node cluster and second influential nodes included in the second node cluster may be identified. In situations in which the graph dataset is a weighted graph dataset, a particular first influential node and/or a particular second influential node may represent a cumulative sum of the weighted edges originating from the particular first influential node and/or the particular second influential node that connect to other nodes included in the graph dataset. The first influential nodes and the second influential nodes may include the nodes that have the greatest cumulative sum of weighted edges of the nodes included in a particular node cluster and/or the overall graph dataset. In some situations, the graph dataset may be a directed graph dataset in which case the cumulative sum of weighted edges for a particular node may include the edges originating from the particular node that connect to other nodes and may exclude the edges originating from other nodes that connect to the particular node.

In some embodiments, the first influential nodes and the second influential nodes may be identified according to a spectral clustering process in which the first node cluster and the second node cluster are set up as optimization problems, such as a QUBO problem, so that techniques for providing solutions to optimization problems may be applied to the first node cluster and the second node cluster to identify the first influential nodes and the second influential nodes. For example, a digital annealing process and/or a quantum annealing process may be applied to the first node cluster and/or the second node cluster to identify the first influential nodes and/or the second influential nodes, respectively, as described above in relation to the environment 100 of FIG. 1. The number of first influential nodes and the number of second influential nodes identified may be set so that an appropriate number of influencer nodes may be designated as described in relation to block 310 below. For example, five or more first influential nodes may be identified from the first node cluster, and five or more second influential nodes may be identified from the second node cluster.

At block 308, the first influential nodes and the second influential nodes may be aggregated as a set of influential nodes, and a cumulative influence of the set of influential nodes on each of the other nodes included in the graph dataset may be determined. In some embodiments, the cumulative influence of the set of influential nodes may be computed in the same or a similar manner as described in relation to Equations (1) and (3) above in relation to the environment 100 of FIG. 1.

At block 310, one or more nodes included in the set of influential nodes may be selected as influencer nodes. In some embodiments, the number of influencer nodes selected at block 310 may be proportionately set relative to the total number of nodes included in the graph dataset. For example, the number of influencer nodes may be set as described in Equations (2) and (4) above in relation to the environment 100 of FIG. 1.

At block 312, a respective object included in the social network that corresponds to each of the influencer nodes may be identified. In some situations, the object corresponding to the influencer node may represent an influential word, phrase, hashtag, or any other topic within a given time period (e.g., in the past, day, past week, past month, or any other time period), which may facilitate identification of trending topics that may be helpful for targeted marketing and advertising. In some situations, the objects corresponding to the influencer node may represent a particular user account of the social network, which may facilitate identification of distributed misinformation bots, spammer accounts, rising celebrity accounts, or any other well-connected or prominent user accounts of the social network.

Modifications, additions, or omissions may be made to the method 300 without departing from the scope of the disclosure. For example, the designations of different elements in the manner described is meant to help explain concepts described herein and is not limiting. Further, the method 300 may include any number of other elements or may be implemented within other systems or contexts than those described.

Figure 4:
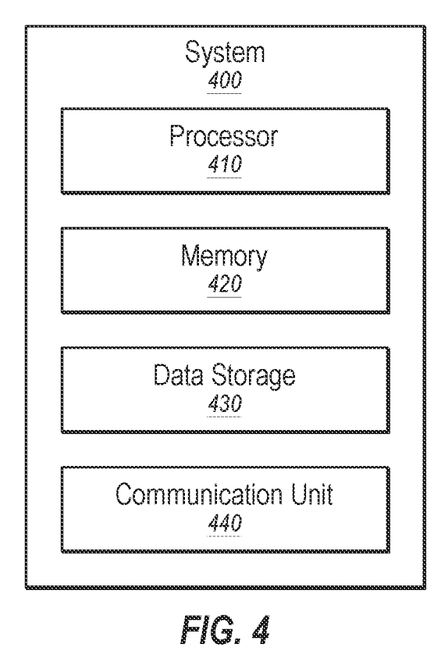
FIG. 4 is an example computer system according to one or more embodiments of the present disclosure.

FIG. 4 is an example computer system 400 according to one or more embodiments of the present disclosure. The computing system 400 may include a processor 410, a memory 420, a data storage 430, and/or a communication unit 440, which all may be communicatively coupled. Any or all of the environment 100 of FIG. 1 may be implemented as a computing system consistent with the computing system 400.

Generally, the processor 410 may include any suitable special-purpose or general-purpose computer, computing entity, or processing device including various computer hardware or software modules and may be configured to execute instructions stored on any applicable computer-readable storage media. For example, the processor 410 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 4, it is understood that the processor 410 may include any number of processors distributed across any number of network or physical locations that are configured to perform individually or collectively any number of operations described in the present disclosure. In some embodiments, the processor 410 may interpret and/or execute program instructions and/or process data stored in the memory 420, the data storage 430, or the memory 420 and the data storage 430. In some embodiments, the processor 410 may fetch program instructions from the data storage 430 and load the program instructions into the memory 420.

After the program instructions are loaded into the memory 420, the processor 410 may execute the program instructions, such as instructions to cause the computing system 400 to perform the operations of the method 300 of FIG. 3. For example, the computing system 400 may execute the program instructions to obtain a graph dataset, partition the graph dataset, identify first influential nodes included in a first node cluster and second influential nodes included in a second node cluster, aggregate the first influential nodes and the second influential nodes as a set of influential nodes, determine a degree of influence of the set of influential nodes, designate one or more of the influential nodes included in the set as influencer nodes, and/or identify an object in the social network that corresponds to a respective influencer node.

The memory 420 and the data storage 430 may include computer-readable storage media or one or more computer-readable storage mediums for having computer-executable instructions or data structures stored thereon. Such computer-readable storage media may be any available media that may be accessed by a general-purpose or special-purpose computer, such as the processor 410. For example, the memory 420 and/or the data storage 430 may include the graph dataset 110, the node clusters 130, the influencer nodes 150, and/or the influencer objects 170 of FIG. 1. In some embodiments, the computing system 400 may or may not include either of the memory 420 and the data storage 430.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 410 to perform a particular operation or group of operations.

The communication unit 440 may include any component, device, system, or combination thereof that is configured to transmit or receive information over a network. In some embodiments, the communication unit 440 may communicate with other devices at other locations, the same location, or even other components within the same system. For example, the communication unit 440 may include a modem, a network card (wireless or wired), an optical communication device, an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, or others), and/or the like. The communication unit 440 may permit data to be exchanged with a network and/or any other devices or systems described in the present disclosure. For example, the communication unit 440 may allow the system 400 to communicate with other systems, such as computing devices and/or other networks.

One skilled in the art, after reviewing this disclosure, may recognize that modifications, additions, or omissions may be made to the system 400 without departing from the scope of the present disclosure. For example, the system 400 may include more or fewer components than those explicitly illustrated and described.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, it may be recognized that changes may be made in form and detail without departing from the scope of the present disclosure. Thus, the present disclosure is limited only by the claims.

In some embodiments, the different components, modules, engines, and services described herein may be implemented as objects or processes that execute on a computing system (e.g., as separate threads). While some of the systems and processes described herein are generally described as being implemented in software (stored on and/or executed by general purpose hardware), specific hardware implementations or a combination of software and specific hardware implementations are also possible and contemplated.

Terms used in the present disclosure and especially in the appended claims (e.g., bodies of the appended claims) are generally intended as "open terms" (e.g., the term "including" should be interpreted as "including, but not limited to.").

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is expressly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase preceding two or more alternative terms, whether in the description, claims, or drawings, should be understood to contemplate the possibilities of including one of the terms, either of the terms, or both of the terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method, comprising:
   obtaining a graph dataset that includes a plurality of nodes and a plurality of edges between the plurality of nodes, the plurality of nodes representing buildings and the plurality of edges representing roads in between the buildings;
   partitioning the graph dataset into a first node cluster and a second node cluster in which the first node cluster and the second node cluster each include one or more nodes from the graph dataset;
   identifying, using a digital annealer, one or more first candidate influential nodes included in the first node cluster and one or more second candidate influential nodes included in the second node cluster, wherein identification of the one or more first candidate influential nodes and the one or more second candidate influential nodes are cast as optimization problems presented as a quadratic unconstrained binary optimization (QUBO) function having a format solvable by the digital annealer, the digital annealer configured to solve the optimization problems to identify the one or more first candidate influential nodes and the one or more second candidate influential nodes, wherein the one or more first candidate influential nodes and the one or more second candidate influential nodes represent the buildings connected to the roads with greater traffic flows;
   selecting one or more of the first candidate influential nodes and the second candidate influential nodes as influencer nodes, the selecting including:
   aggregating the first candidate influential nodes and the second candidate influential nodes as a set of candidate influential nodes; determining a cumulative influence of the set of candidate influential nodes based on summing respective influences of each node included in the set of candidate influential nodes on each other node included in the graph dataset but not included in the set of candidate influential nodes; and selecting the influencer nodes from the set of candidate influential nodes based on respective influences of the first candidate influential nodes and of the second candidate influential nodes exerted on other nodes included in the graph dataset; and
   identifying a respective building included in the graph dataset corresponding to each of the influencer nodes.

2. The method of claim 1, wherein partitioning the graph dataset includes into the first node cluster and the second node cluster includes dividing the graph dataset so that the first node cluster and the second node cluster include a same number of nodes or a number of nodes within a threshold value of one another.

3. The method of claim 1, wherein a number of first candidate influential nodes identified as being included in the first node cluster and a number of second candidate influential nodes identified as being included in the second node cluster are proportional to a total number of nodes included in the graph dataset.

4. The method of claim 1, wherein the graph dataset is a weighted directed graph dataset in which edges connecting the plurality of nodes include respective weight values and respective directionalities.

5. The method of claim 4, wherein determining a degree of influence of each of the first candidate influential nodes and each of the second candidate influential nodes includes computing a cumulative sum of the edges originating from a particular first candidate influential node or a particular second candidate influential node that connect to other nodes included in the graph dataset.

6. One or more non-transitory computer-readable storage media configured to store instructions that, in response to being executed, cause a system to perform operations, the operations comprising:
   obtaining a graph dataset that includes a plurality of nodes and a plurality of edges between the plurality of nodes, the plurality of nodes representing buildings and the plurality of edges representing roads in between the buildings;
   partitioning the graph dataset into a first node cluster and a second node cluster in which the first node cluster and the second node cluster each include one or more nodes from the graph dataset;
   identifying, using a digital annealer, one or more first candidate influential nodes included in the first node cluster and one or more second candidate influential nodes included in the second node cluster, wherein identification of the one or more first candidate influential nodes and the one or more second candidate influential nodes are cast as optimization problems presented as a quadratic unconstrained binary optimization (QUBO) function having a format solvable by the digital annealer, the digital annealer configured to solve the optimization problems to identify the one or more first candidate influential nodes and the one or more second candidate influential nodes, wherein the one or more first candidate influential nodes and the one or more second candidate influential nodes represent the buildings connected to the roads with greater traffic flows;
   selecting one or more of the first candidate influential nodes and the second candidate influential nodes as influencer nodes, the selecting including:
   aggregating the first candidate influential nodes and the second candidate influential nodes as a set of candidate influential nodes; determining a cumulative influence of the set of candidate influential nodes based on summing respective influences of each node included in the set of candidate influential nodes on each other node included in the graph dataset but not included in the set of candidate influential nodes; and selecting the influencer nodes from the set of candidate influential nodes based on respective influences of the first candidate influential nodes and of the second candidate influential nodes exerted on other nodes included in the graph dataset; and identifying a respective building included in the graph dataset corresponding to each of the influencer nodes.

7. The one or more non-transitory computer-readable storage media of claim 6, wherein partitioning the graph dataset includes into the first node cluster and the second node cluster includes dividing the graph dataset so that the first node cluster and the second node cluster include a same number of nodes or a number of nodes within a threshold value of one another.

8. The one or more non-transitory computer-readable storage media of claim 6, wherein a number of first candidate influential nodes identified as being included in the first node cluster and a number of second candidate influential nodes identified as being included in the second node cluster are proportional to a total number of nodes included in the graph dataset.

9. The one or more non-transitory computer-readable storage media of claim 6, wherein the graph dataset is a weighted directed graph dataset in which edges connecting the plurality of nodes include respective weight values and respective directionalities.

10. The one or more non-transitory computer-readable storage media of claim 9, wherein determining a degree of influence of each of the first candidate influential nodes and each of the second candidate influential nodes includes computing a cumulative sum of the edges originating from a particular first candidate influential node or a particular second candidate influential node that connect to other nodes included in the graph dataset.

11. A system comprising:
one or more processors; and
one or more non-transitory computer-readable storage media configured to store instructions that, in response to being executed, cause the system to perform operations, the operations comprising:
obtaining a graph dataset that includes a plurality of nodes and a plurality of edges between the plurality of nodes, the plurality of nodes representing buildings and the plurality of edges representing roads in between the buildings;
partitioning the graph dataset into a first node cluster and a second node cluster in which the first node cluster and the second node cluster each include one or more nodes from the graph dataset;
identifying, using a digital annealer, one or more first candidate influential nodes included in the first node cluster and one or more second candidate influential nodes included in the second node cluster, wherein identification of the one or more first candidate influential nodes and the one or more second candidate influential nodes are cast as optimization problems presented as a quadratic unconstrained binary optimization (QUBO) function having a format solvable by the digital annealer, the digital annealer configured to solve the optimization problems to identify the one or more first candidate influential nodes and the one or more second candidate influential nodes, wherein the one or more first candidate influential nodes and the one or more second candidate influential nodes represent the buildings connected to the roads with greater traffic flows;
selecting one or more of the first candidate influential nodes and the second candidate influential nodes as influencer nodes, the selecting including:
aggregating the first candidate influential nodes and the second candidate influential nodes as a set of candidate influential nodes; determining a cumulative influence of the set of candidate influential nodes based on summing respective influences of each node included in the set of candidate influential nodes on each other node included in the graph dataset but not included in the set of candidate influential nodes; and selecting the influencer nodes from the set of candidate influential nodes based on respective influences of the first candidate influential nodes and of the second candidate influential nodes exerted on other nodes included in the graph dataset; and
identifying a respective building included in the graph dataset corresponding to each of the influencer nodes.

12. The system of claim 11, wherein partitioning the graph dataset includes into the first node cluster and the second node cluster includes dividing the graph dataset so that the first node cluster and the second node cluster include a same number of nodes or a number of nodes within a threshold value of one another.

13. The system of claim 11, wherein a number of first candidate influential nodes identified as being included in the first node cluster and a number of second candidate influential nodes identified as being included in the second node cluster are proportional to a total number of nodes included in the graph dataset.

14. The system of claim 11, wherein the graph dataset is a weighted directed graph dataset in which edges connecting the plurality of nodes include respective weight values and respective directionalities.

15. The system of claim 14, wherein determining a degree of influence of each of the first candidate influential nodes and each of the second candidate influential nodes includes computing a cumulative sum of the edges originating from a particular first candidate influential node or a particular second candidate influential node that connect to other nodes included in the graph dataset.

* * * * *